Sept. 1, 1925.

P. G. DARLING

SAFETY VALVE

Filed June 25, 1923

1,551,547

INVENTOR
Philip G. Darling
BY
Duell, Warfield & Duell
ATTORNEY

Patented Sept. 1, 1925.

1,551,547

UNITED STATES PATENT OFFICE.

PHILIP G. DARLING, OF BRIDGEPORT, CONNECTICUT, ASSIGNOR TO MANNING, MAXWELL & MOORE, INC., OF NEW YORK, N. Y., A CORPORATION OF NEW JERSEY.

SAFETY VALVE.

Application filed June 25, 1923. Serial No. 647,460.

*To all whom it may concern:*

Be it known that I, PHILIP G. DARLING, a citizen of the United States, residing at Bridgeport, in the county of Fairfield and State of Connecticut, have invented certain new and useful Improvements in Safety Valves, of which the following is a full, clear, and exact description, such as will enable others skilled in the art to which it appertains to make and use the same.

This invention relates to valves and more particularly to valves adapted to open upon the exertion of a predetermined pressure.

An object of this invention is to provide a device of the character described which will be inexpensive in manufacture and efficient in operation.

A further object is to provide a device of the character described in which perfect freedom of operation is obtained while the actuating mechanism is protected from the deleterious effect of the controlled fluid.

A further object is to enable a device of the character described to be manufactured with a minimum number of machined surfaces.

Other objects of the invention will in part be obvious and will in part appear hereinafter.

In devices of the character described there may be used a mechanism to control or be controlled by the valve which is of such a character that it is desirable that it shall not come in contact with the fluid to be controlled. More particularly when the invention is used in connection with a safety valve for the control of steam in which the valve is urged toward its seat by a spring or the equivalent, it may be found desirable to house the spring in such a manner as to permit the freedom of movement of the valve but to protect the spring at all times from contact with the fluid.

The invention accordingly comprises the features of construction, combinations of elements, and arrangement of parts, which will be exemplified in the construction hereinafter set forth and the scope of the application of which will be indicated in the claims.

Since in practice, the incorporation of this invention with pressure valves for the control of steam is especially advantageous and typical of the uses to which it may be put, a steam safety valve embodying the essential elements thereof is represented by the accompanying drawings, in which—

Figure 2:
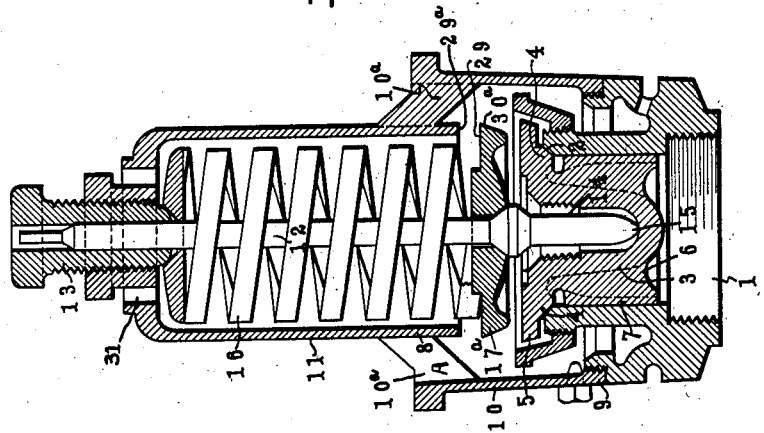
Fig. 2 is a similar view of a modification.

As illustrated the numeral 1 represents a stud adapted to be screwed into a source of steam supply carrying at its upper end the valve seat 2 which may conveniently be in the shape of a conical frustum. Adapted to co-operate with this seat is a valve member 3 having a valve surface 4 corresponding to the seat surface 2.

This valve is preferably in the form of a disc 5 carrying on its under side flanges 6 adapted to co-operate with a cylindrical surface 7 in the stud to guide the valve in its movement to and from the valve seat surface.

A housing 8 is adapted to be screwed as at 9 onto the stud 1 in such position that a lower portion or shell 10 of said housing will surround the valve and valve seat surfaces and a second portion will project thereabove to form a housing 11 as will be later described. The shell 10 and housing 11 are preferably radially spaced from each other and attached together by ribs 10$_a$ to form therebetween orifices A, for the escape of steam or the orifices may be formed at any other convenient point as for example at the bottom of the shell.

A stem 12 is arranged for longitudinal vertical movement in a bushing 13 in the upper wall of the housing 11 and extends from there downwardly into a recess 14 in the valve where it bears against the bottom of said recess as shown at 15. Mounted within the housing 11 is a spring 16 which may be conveniently arranged to bear against the under side of the bushing 13 and at its other extremity to bear upon a washer 17 which is connected to the rod 12 by bearing against a collar 18 fitting tight upon the rod and preferably engaging a notch therein as shown at 19. The force of the spring 16 is thus exerted between the bushing 13 and the valve 3 through the medium of the rod 12, to urge the valve toward its seat.

Figure 1:
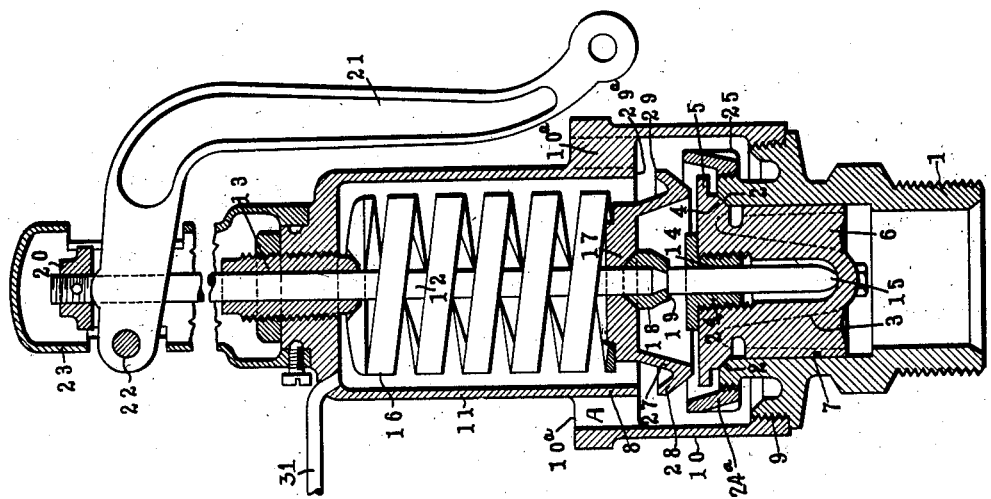
Figure 1 is an elevation with the outer parts in section of such a valve, constructed in accordance with the invention.

In the form illustrated in Fig. 1 the rod 12 extends upwardly beyond the upper portion of the housing 11 where there is attached to it a collar 20 in position to be engaged by a lever 21 pivoted as at 22 to a cap 23 fastened upon the top of the housing 11. By this means the lever 21 may be caused to raise the collar 20 to lift or assist in raising the valve from its seat.

A bushing 24 will be provided within the recess in the valve 3 to engage the rod 12 and maintain the rod co-axial with the valve.

In the form illustrated I prefer to provide a blow-down ring 24ª which may be conveniently screwed to the outside of the stud 1 at a point opposite the valve surface. The outer surface of the blow-down ring is provided with flutings shown at 25, to enable its position to be easily adjusted whereby the blow-down pressure of the valve is changed, and its inner surface is smoothly conical as shown.

With a device of this character it is desirable that the steam be prevented from gaining access to the spring chamber and yet it is not desirable to provide a cap for the lower end of the spring chamber to close it at all times as provision must be made for reciprocatory movement between the cap and said housing to permit the valve to move. The cap should not have a sliding contact with the housing as in this event it would have excess of friction therewith and the expense of machining such co-operating surfaces would be detrimental to the marketing of the valve.

It has been discovered that the spring housing may be closed by a cap movable with the valve member, and that by properly co-relating the various factors, the cap may be arranged in spaced relation to the housing when the valve is closed and movable toward said housing as the valve opens, while at the same time its surfaces may be so arranged that the rush of steam past them will completely prevent the entrance of any steam into the spring chamber whether the movement of the valve be sufficient to bring the washer into complete engagement with the lower end of the housing or not. To prevent rebound of compressed air entrapped in casing 11, by sudden opening of the valve, an exit opening 31 may be provided therein.

In the arrangement shown in Fig. 1 the washer 17 is provided with a downwardly flaring apron 27 having an upwardly directed flange 28 at its lower edge. This flange 28 has an edge face 29 adapted when the valve is fully open nearly to contact with the lower edge 29ª of the casing 11. The outer surface of the flange 28 is smoothly conical and spaced from the inner surface of the ring 24ª, thus providing an annular orifice, the opposite walls of which preferably converge as illustrated, through which the steam escaping from the opened valve issues. This annular jet flares upwardly and outwardly thus diverging from the axis of the valve and increasing in diameter as it escapes from the constricted annular orifice or nozzle. This annular outwardly diverging jet has a powerful ejector action tending to draw air or vapor from within the casing 11 out through the orifice between the surfaces 29 and 29ª, thus effectually preventing entrance of steam into the casing 11 even though the surfaces 29 and 29ª should be spaced a considerable distance apart.

The device illustrated in Fig. 2 is substantially similar to that illustrated in Fig. 1. In this case the washer 17ª is of somewhat different construction but nevertheless has deflecting surface 30ª in position to prevent the entrance of any steam to the interior of the housing and it contains at the upper edge of said deflecting surface a surface 29 adapted to approach the lower end 29ª of the housing when the valve is raised. As illustrated in this drawing no lever is provided for opening the valve but this is an optional feature which can be used with either form of the device or with neither.

In either form the operation will be clear from the above description. When the steam pressure exceeds the tension on the spring 16, the valve 5 will rise carrying the washer 17, which by the approach of the surface 29 to the surface 29ª will tend to close the housing. The deflector 30ª will deflect the steam flow outwardly away from the opening between the surfaces 29 and 29ª, thus creating a suction at that point which effectually prevents the admission of steam to the chamber 11 whether the surfaces 29 and 29ª be in actual contact, to make a tight closure or not. It is therefore not necessary that these surfaces be accurately machined.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device of the character described, in combination, a valve seat and valve member, a spring adapted to urge said valve member toward the valve seat, a casing enclosing the spring, said casing having a normally open end spaced from the valve seat, a member normally spaced from the end of the casing and adapted to be moved by the valve member into close proximity to the edge of the open end of the casing when the valve member is forced away from its seat whereby substantially to close said open end, and means for directing fluid escaping from beneath the opened valve away from the open end of the casing.

2. A device of the class described comprising a valve seat, a valve co-operable therewith, a spring urging the valve toward its seat, a casing enclosing the spring, the casing having an open end spaced from the valve seat, and a member constituting an abutment for the spring, said member being diametrically greater than and normally spaced from the open end of the casing but being movable with the valve and in its limiting position of movement adapted substantially to close said open end of the casing.

3. A device of the class described comprising an annular valve seat, a valve co-operable therewith, a spring normally operative to hold the valve against the seat, a casing housing the spring, said casing normally being open at that end adjacent to the valve, and means comprising opposed spaced substantially smooth conical surfaces operative upon opening of the valve for directing the fluid escaping therefrom in an annular stream diverging outwardly and away from the lower edge of the casing.

4. A device of the class described comprising an annular valve seat, a valve co-operating therewith, a spring pressing the valve toward its seat, a casing housing the spring, said casing being coaxial with the valve seat and having one end spaced from and normally open toward the valve, means coaxial with the valve seat providing a substantially smooth conical surface diverging outwardly therefrom, and means interposed between the valve and the open end of the casing co-operating with said diverging surface to direct the fluid issuing from between the valve and its seat in an annular stream diverging away from the open end of the casing.

5. A device of the class described comprising a valve seat, a valve co-operable therewith, a spring pressing the valve toward its seat, a cylindrical casing housing the valve, one end of the casing being axially spaced from the valve seat and open toward the latter, and a circular member coaxial with the valve seat and constituting an abutment for one end of the spring, said member being of a diameter substantially equal to that of the casing and having a smooth peripheral edge diverging outwardly from the valve for directing the fluid issuing from the valve in an annular stream diverging outwardly and away from the open end of the casing.

6. A device of the class described comprising a valve seat, a valve co-operating therewith, means for pressing the valve against the seat, a casing housing said means, the casing having an open end spaced from the valve seat, a circular apron coaxial with the valve seat and movable with the valve, said apron having a surface movable into close proximity to the edge of the open end of the casing and a substantially smooth conical peripheral edge divergent from the valve seat, and an annular blow-down ring also having a smooth conical divergent surface co-operable with the conical edge of the apron to direct the fluid issuing from the valve outwardly and away from the open end of the casing.

7. A device of the class described comprising a valve seat, a valve co-operable therewith, said valve having an axial stem, an abutment secured to the stem, a spring engaging the abutment to press the valve toward its seat, a casing housing the spring, said casing having an open end spaced from the valve seat, an apron projecting from the spring abutment having a peripheral edge diverging outwardly from the valve seat, said apron normally being spaced from the open end of the casing and diverting fluid issuing from the valve seat outwardly and away from the open end of the casing.

8. A device of the class described comprising a valve seat, a valve co-operable therewith, said valve having an axial stem, a casing concentric with the stem, said casing having an open end spaced from the valve, a spring housed in the casing, a washer secured to the stem constituting an abutment for one end of the spring, said washer normally being disposed within the open end of the casing, an annular apron extending from the edge of the washer toward the valve, said apron having an annular surface normally spaced from but engageable with the edge of the open end of the casing, and a peripheral edge portion divergent outwardly and away from the valve seat.

In testimony whereof I affix my signature.

PHILIP G. DARLING.